United States Patent [19]
Faude et al.

[11] Patent Number: 5,280,229
[45] Date of Patent: Jan. 18, 1994

[54] CHARGING DEVICE FOR RECHARGEABLE BATTERIES

[75] Inventors: Rudolf Faude, Balingen; Martin Lohner, Balingen-Ostdoft, both of Fed. Rep. of Germany

[73] Assignee: BSG-Schalttechnik GmbH & Co. KG, Balingen, Fed. Rep. of Germany

[21] Appl. No.: 790,780

[22] Filed: Nov. 12, 1991

[30] Foreign Application Priority Data

Nov. 15, 1990 [DE] Fed. Rep. of Germany ....... 4036374

[51] Int. Cl.$^5$ .............................................. H02J 7/00
[52] U.S. Cl. ............................................. 320/2; 455/90
[58] Field of Search ................... 320/2, 5, 6, 15, 17, 320/18; 455/89, 90

[56] References Cited

U.S. PATENT DOCUMENTS

| | | | |
|---|---|---|---|
| 3,579,075 | 5/1971 | Floyd | 320/2 |
| 3,696,283 | 10/1972 | Ackley, III | 320/2 |
| 4,303,876 | 12/1981 | Kelly, III et al. | 320/2 |
| 4,558,270 | 12/1985 | Liautaud et al. | 320/2 |
| 4,636,703 | 1/1987 | Tohya et al. | 320/2 |
| 4,727,306 | 2/1988 | Misak et al. | 320/35 |
| 4,816,735 | 3/1989 | Cook et al. | 320/2 |
| 4,873,479 | 10/1989 | Iimura et al. | 320/2 |
| 5,057,761 | 10/1991 | Felegyhazi, Sr. | 320/2 |
| 5,065,082 | 11/1991 | Fushiya | 320/2 |

FOREIGN PATENT DOCUMENTS

| | | | |
|---|---|---|---|
| 0332475 | 9/1989 | European Pat. Off. | |
| 2702129 | 7/1978 | Fed. Rep. of Germany | |
| 0095139 | 4/1990 | Japan | 320/2 |

Primary Examiner—Kristine L. Peckman
Attorney, Agent, or Firm—Darby & Darby

[57] ABSTRACT

A charging device for rechargeable batteries. The device includes a basic charging device, which contains a recharging circuit which may include a transformer, rectifier and control circuit. An interchangeable adapter insert is received in this basic device. Each insert has the same exterior shape but a different type of inner loading channel that is compatible with the geometry of a particular type of battery that is to be charged. Thus, any type of rechargeable battery may be charged with one basic device and appropriate, additional interchangeable inserts.

17 Claims, 4 Drawing Sheets

CHARGING DEVICE FOR RECHARGEABLE BATTERIES

BACKGROUND OF THE INVENTION

The present invention relates to a charging device for rechargeable batteries of any size, voltage and capacity.

Charging devices for rechargeable storage batteries are known in various forms. (Although the term "storage batteries" is used herein, it is to be interpreted as meaning any type of rechargeable battery.) They are used for charging suitable storage batteries repeatedly and include a broad spectrum of devices in order to charge different kinds of storage batteries as exemplified by heavy vehicle batteries down to the smallest button cell.

Recently, charging devices for storage batteries are being used to a greater extent because more and more battery-operated devices are being used. Such batteries are used not only in the domestic area (rechargeable toothbrushes, flashlights, etc.), but also in the handicraft and industrial sectors, especially also for electric tools. To avoid the need for being connected to an electrical network, electric tools have a storage battery pack or some other power supply equipment which makes them independent of such a network.

Such storage battery packs, as well as the nickel-cadmium storage batteries which are already being used frequently at the present time, are obtainable in the common battery sizes and can, in some cases, withstand more than 1,000 charging cycles. They are preferred over regular batteries not only for environmental reasons, but also because they can provide high currents for long periods of time for driving motors.

Until now, practically any device which is used in the household, the trade or the industry and obtains its power from storage batteries, has at its disposal its own, specially matched charger. Such a charger is designed so that many hours of charging time are required before the device can be used again.

Such chargers usually have all of the equipment required for charging the storage battery or batteries satisfactorily. Such equipment includes transformers, rectifier circuits, control systems, temperature sensors to avoid overheating the storage battery during the charging, etc. However, such equipment is not suitable for use with storage battery packs or rechargeable batteries of a different size and/or different capacity that usually also have a different type of connector. This not only leads to inconvenience when the various devices driven by storage batteries are used, but also to undesirable investments in inventory and extensive inventory storage requirements.

Universal chargers for rechargeable batteries are known, particularly if they are of a size for charging conventional monocells or baby cells. Such chargers have several possible positions, perhaps being adjustable by spring tension. However, these chargers, which have not been matched to the batteries, generate only a particular, low charging current and cannot take the state of the battery into consideration nor determine, for example, the temperature of the battery.

It is desired to provide an integrated, yet universally applicable storage battery charging system in modular construction so that rechargeable storage batteries of any size, voltage and capacity may be recharged within a very short time if desired.

SUMMARY OF THE INVENTION

The invention is directed to a universal charging device for rechargeable storage batteries of any size, shape, voltage and capacity. It includes a basic module, as the basic device, which contains all the circuits required for the actual electrical charging process; that is, the transformer, the rectifier and the control circuit, including elements reacting to temperature signals. The module is adapted to receive any one of a plurality of adapters which, in turn, receive differently configured batteries. Thus, a whole group of different rechargeable storage batteries can be recharged by this single basic module, thereby providing considerable price savings as compared to procuring chargers that may be used only for specific types.

The basic module, as a basic device, contains an appropriate, electronic system for controlling, regulating and monitoring the respective charging process. The additional adapter part, which is to be connected with the basic module, may be little more than a molded part, which is adapted to the corresponding shape of the rechargeable storage battery that is to be accommodated. The molded part contains only contacts for passing on the charging current, which originates from the basic module, to the corresponding storage battery and, for providing appropriate information concerning the temperature of the storage battery if desired and necessary.

The additional adapter part, which is inserted in a suitable, accommodating channel of the basic module or basic device, is used with any of the constructions required for the storage battery, which are to be inserted and then charged. Moreover, the external shapes of the additional adapter parts are identical, so that they all fit in the same accommodating channel of the basic device. This results in a pleasing appearance of the storage battery charging system and only the individual charging channels of the additional adapter parts differ from one another.

It is furthermore also advantageous to design the basic device so that a first, partial, lateral housing serves to accommodate the electrical and electronic components and is packed full with them, that is, the transformer, rectifier and electronics, including the regulating and control circuits. Appropriate cooling openings can also be provided. A further part of the housing, which adjoins laterally, is then provided with the accommodating channel of the different adapter inserts or interchangeable inserts. Due to the introduction of an interchangeable insert in the accommodating channel of the basic device, appropriate contacts in the basic device are engaged. These contacts are always at the same place. Electrical connection lines, starting out from these contacts in the respective interchangeable insert, lead to the charging channel in the interchangeable insert. In their position, shape and structure, these electrical connection lines are then adapted to the different storage batteries that are to be charged.

For charging of smaller storage batteries or rechargeable batteries, it is also possible to equip an interchangeable channel with more than only one charging channel. In this manner, at least two storage batteries, which then preferably have the same electrical data or characteristics, can be charged simultaneously. Preferably, the charging electronics are designed in this case so that the two inserted storage batteries are charged consecutively. At the end of a certain period of time, such as, over night, the two freshly recharged storage batteries can be removed the next morning.

The control electronics preferably are designed so that they automatically react to the respective electrical data of the storage battery that is to be charged. For example, by means of an initial current pulse from the control device itself to the storage battery that is to be charged, the capacity and the rated voltage of the storage battery can be ascertained, so that the appropriate charging currents can then be made available by the basic device.

Using modern technologies for the transfer of data and supply voltage merely over two-wire lines, it is also possible to address the different inserts from the control circuit of the basic device and to charge storage batteries, which are seated in inserted, additional adapter parts or interchangeable inserts, in timed sequence or, if the storage batteries are identical, to carry out the charging process also in parallel and simultaneously for the connected storage batteries by increasing the current appropriately.

A uniform embedding of an imprinted lattice configuration, representing electrical line connections, is provided in each of the different exchangeable inserts for the accommodating channel on the basic device. In this case, the external contacts of the interchangeable inserts are always in the same location so that the contacts in the accommodating channel of the basic device, which are also in a corresponding location, can be engaged. The imprinted lattice lines can then be extended to different positions in the interior of the respective interchangeable insert. At such positions, a corresponding storage battery, which received in this interchangeable insert, has its contacts mate with the interchangeable insert when pushed into the charging channel. The contact positions for different batteries may be different in each case. In this arrangement, it is not necessary to break off the electrical flat ribbon conductors from the lattice configuration. The conductors are in any case at those positions within the charging channel at which the storage battery, which is designated for this charging channel of the respective interchangeable insert, can make contact. Under these circumstances, it is possible to work at all times with the same stamped-out lattice configuration.

BRIEF DESCRIPTION OF THE DRAWINGS

Embodiments of the invention are shown in the following drawings and are explained in greater detail in the description that follows, it being understood that these embodiments are given by way of illustration and not by way of limitation.

DESCRIPTION OF THE PREFERRED EMBODIMENT

The basic concept of the present invention provides for a comprehensive, universal storage battery charging system with a basic device and with an arbitrary plurality of exchangeable adapter inserts. The inserts may be of several types covering the electrical parameters and inserted into the basic device. As a result, the necessary electrical connections become effected immediately between the basic device and the arbitrary number of interchangeable adapter inserts after the insertion into the basic device.

Figure 1:
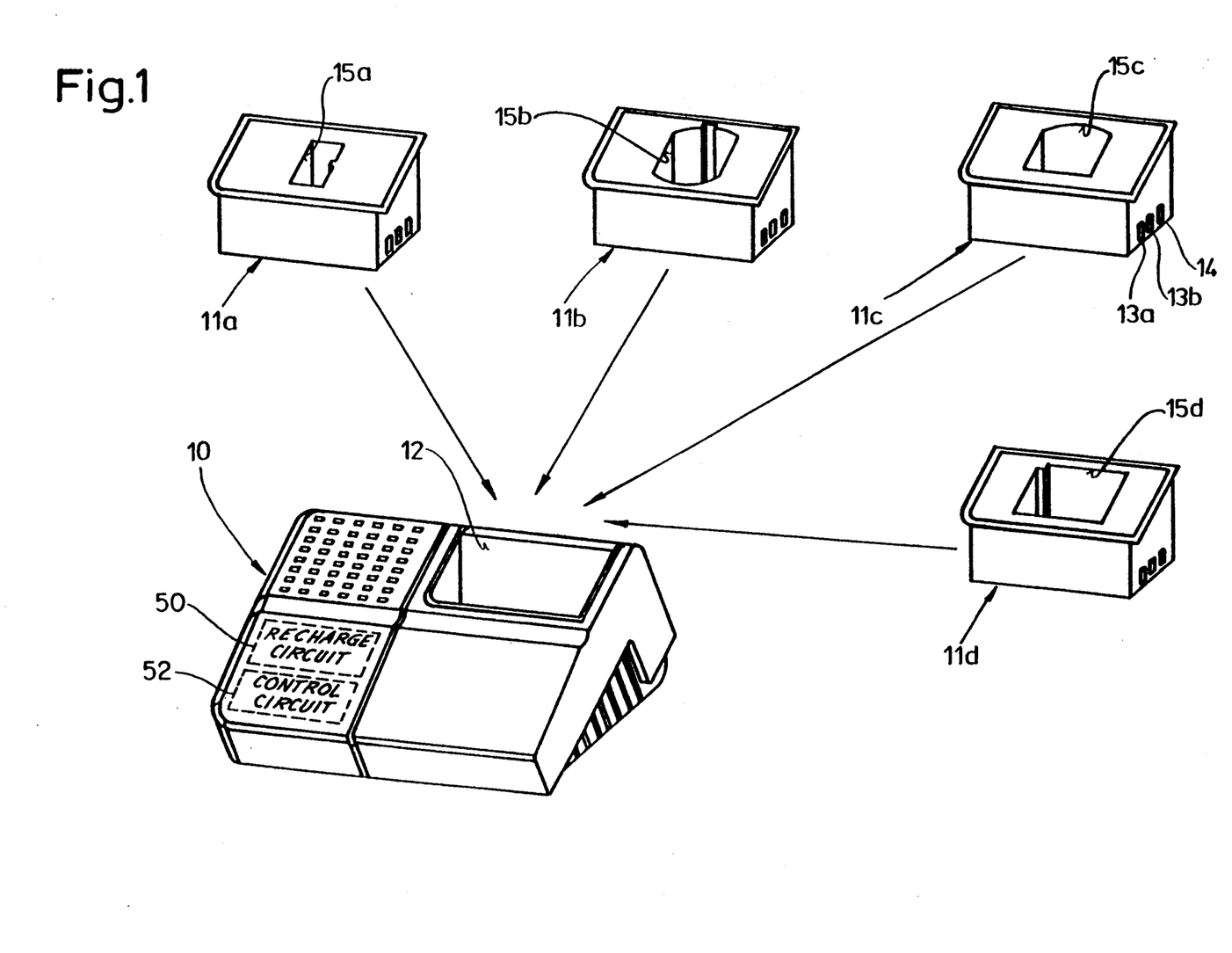
FIG. 1 shows a perspective view of a basic device with an accommodating channel, into which may be inserted any one of an unlimited number of different additional adapter parts or interchangeable adapter inserts in accordance with the invention. The respective charging channel configurations manifest the difference between the adapter inserts.

FIG. 1 shows the basic device or electronic module 10 and the unlimited interchangeable adapter inserts 11a, 11b, 11c, 11d . . . which differ only with respect to the shape of their inner charging channel. The basic device preferably has a double-case basic construction and accommodates a recharging circuit 50 shown in phantom lines on the left side of the basic device depicted in FIG. 1. The recharging circuit 50 is conventional, containing the typical control circuit, transformer, rectifier, etc. Vents 41 are provided for cooling purposes. An accommodating channel 12 is provided as shown in the upper right side of the basic device as depicted in FIG. 1. The channel 12 has a continuous, uniform shape for each basic device and into which the external dimensions of the respective interchangeable adapter inserts 11a, 11b, 11c, 11d . . . fit flush. The electrical connection between the basic device and the interchangeable insert is also produced immediately upon insertion of the respective interchangeable adapter insert.

For this purpose, the interchangeable insert has, as shown in FIG. 1, three contacts at the specified site, namely contacts 13a and 13b for the positive and negative lines, as well as a contact 14 for a temperature sensor. The opposite contacts of the basic device are disposed in an appropriate manner in the accommodating channel so that an electrical connection is produced automatically when the interchangeable insert is pushed into the channel. Contacts of any type and also contacts under spring pressure may be used here for making the desired contact in order to have a reliable through-connection at all times.

The electronics of the recharge circuit 50 may include a transformer and a rectifier, which are present only in the module 10. The electronics also detects the electrical data (rated voltage, capacity) of the storage battery that is to be charged so that the charging process may be appropriately matched.

In accordance with the invention, the interchangeable adapter inserts are available in different constructions with respect to their charging channels as well as with respect to their inner contacts, which are disposed in these charging channels for contacting the respective storage battery connection. In this manner, each type of rechargeable storage battery can be charged by the battery charging device of the present invention. Not only are considerable price advantages achieved, but one may select from a plurality of different storage battery packs and rechargeable batteries. The space required is also reduced because only a single electronic module is required for the control, regulation and monitoring of the charging process. In each case, the module is in the basic device, while electronics are not needed in the interchangeable adapter inserts, with the exception of the contacts present and, optionally, grounded connection lines.

A temperature sensor contact 14 is always present in certain critical chargers in order to sense the temperature state of the storage battery that is to be charged. Usually, many storage battery packs already have three contact connections, one of which leads to the temperature sensor within the storage battery pack.

Alternatively, the charging channel of the interchangeable inserts may be constructed in such a manner that, for the case of storage batteries, rechargeable batteries or storage battery packs which do not have a temperature sensor; the temperature of the inserted storage battery may be sensed by the charging channels own temperature sensor in accordance with the invention.

Figure 2:
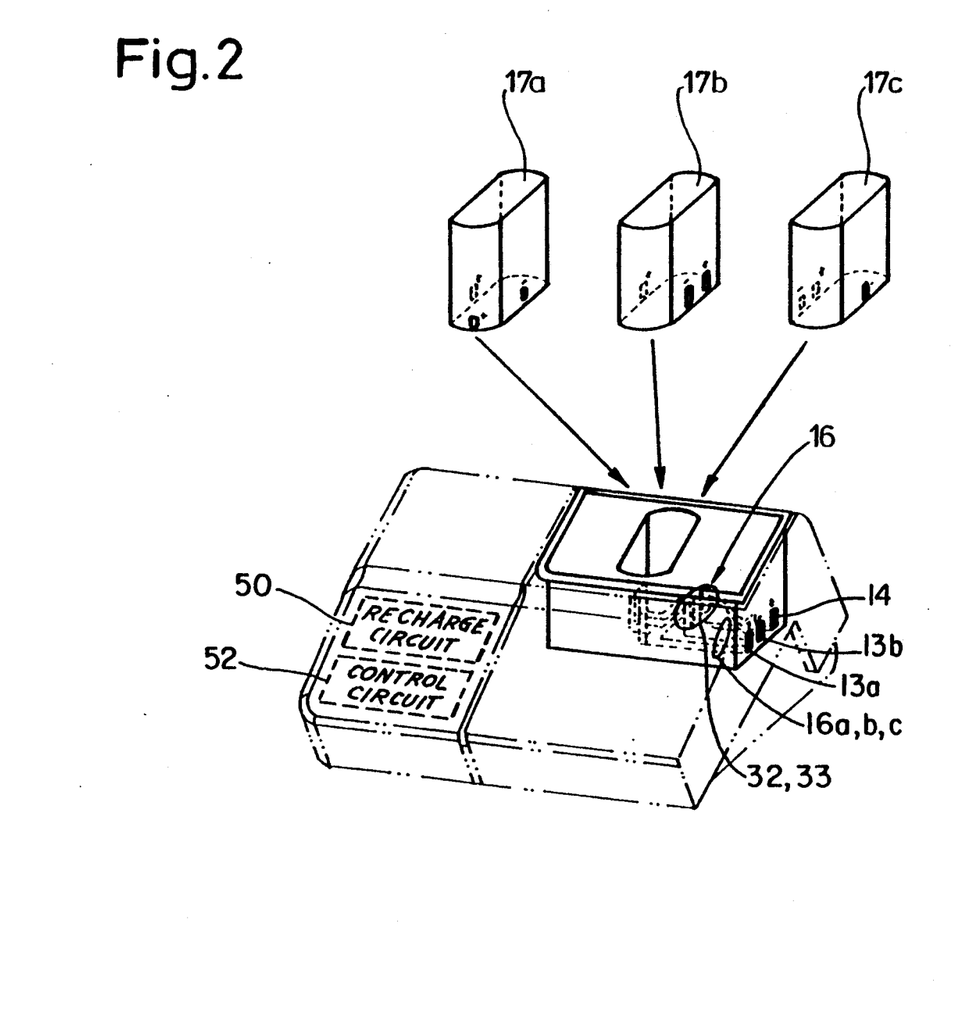
FIG. 2 shows a perspective view of the invention of FIG. 1 after insertion into the basic device, with special emphasis on the area of the interchangeable adapter insert. In this case, exchangeable inserts may be produced with identical lattice configurations to accommodate insertion of any of the different storage batteries which are to be charged. The different position of the battery contacts are taken into account in the layout of the lattice configuration.

FIG. 2 illustrates an arrangement for establishing electrical connections between the interchangeable inserts and different storage batteries and storage battery packs without great expense, by using a universally applicable lattice configuration forming electrical lines, preferably in the form of narrow brass strips. This is accomplished by providing a lattice configuration 16 that has three line branches 16a, b, c which commence where the external connection to the basic device is accomplished by contacts 13a, 13b and 14. The line branches then fan out and extend to turn around in any manner desired in order to form contacts with the inserted, storage batteries in accordance with the different requirements of the respective charging channels 15a, 15b, 15c. The line branches may be considered conductive tracks having different conducting paths within or on the adapter insert. The lattice configuration 16 may be stamped or imprinted onto the adapter insert.

Illustratively shown above the universally applicable lattice configuration 15 are the different storage batteries 17a, 17b, 17c. The storage batteries may be identical in their external shape, but have their positive and negative connections, as well as their temperature connection, at different locations. The universal lattice configuration 16 takes these differences into account by extending each branch 16a, b, and c to where the different locations of a respective one of the different battery contacts is positioned.

Figure 3:
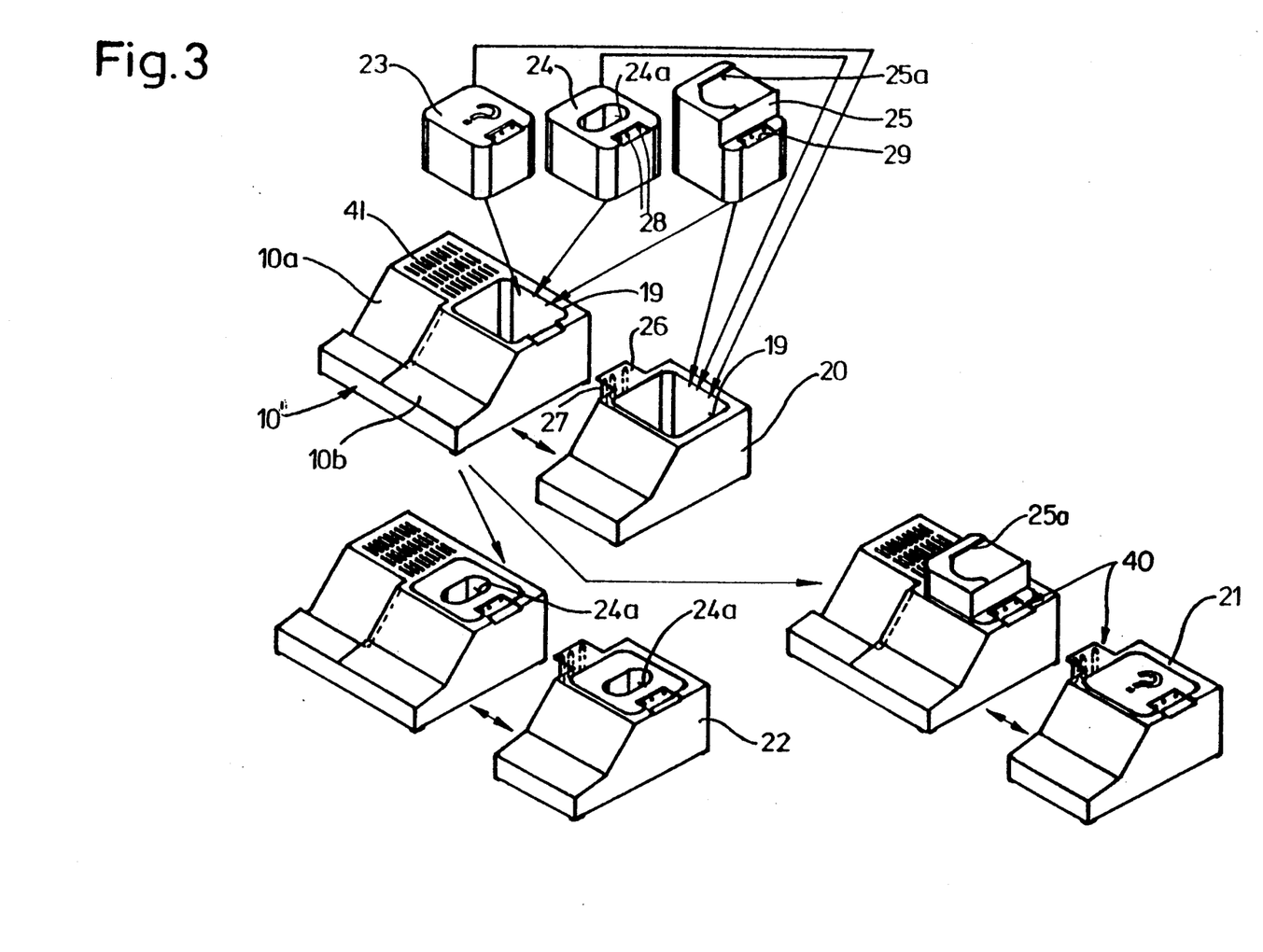
FIG. 3 shows a perspective view of another embodiment of the invention, comprising a basic device with interchangeable adapter inserts and an additional partial adapter housing at the side for the supplementary adaptation to different storage batteries. Simultaneously, electrical connections are produced which have accommodating channels for the interchangeable adapter inserts.

FIG. 3 illustrates first of all the universal applicability and feasibility of another embodiment. A basic device 10' comprises, as shown in the left side of the drawing, a housing section 10a, which accommodates the transformer, rectifier and electronic circuit parts, as well as, in the right side of the drawing, a housing section 10b with the accommodating channel opening 19. In addition, at the side of the basic device, additional adapter parts 20, 21, 22 . . . of a second type are provided, each of which having an accommodating channel without its own electronic system and which can be connected by means of plug and socket connectors, designated generally by the reference numeral 40, with the basic device 10'.

Moreover, if the accommodating channels 19 do not have a special inner contour which is fitted to a given storage battery or rechargeable battery, they can be provided with one of a plurality of existing interchangeable adapter inserts 23, 24, 25.

In view of the additional adapter parts of the second type with the interchangeable adapter inserts, the possibility arises to increase the number of storage batteries which can be charged simultaneously. These further, additional adapter parts 20, 21, 22 can be connected electrically with the basic part by suitable plug and socket connectors 40.

On each additional adapter part, the connector 40 may comprise a projecting plug connector contact edge 26, on which downwardly pointing connector pins 27 are disposed. The pins 27 engage corresponding connectors 28 on the basic device 10', which are open in the upwards direction.

The individual interchangeable adapter inserts 23, 24, 25 in turn include the actual charging channels 24a, 25a. The additional adapter parts 20, 21 or the interchangeable adapter inserts 23, 24 and 25 contain only contact connections in that the electrical connection is established via the different contact connections from the basic device (containing the charging circuitry) to a corresponding, additional adapter parts 20, 21 and, from this, over the appropriately "standardized" contact connections within the adapter part to the respective charging channel of the adapter insert received within the adapter part.

Figures 4, 5, 6, 7:
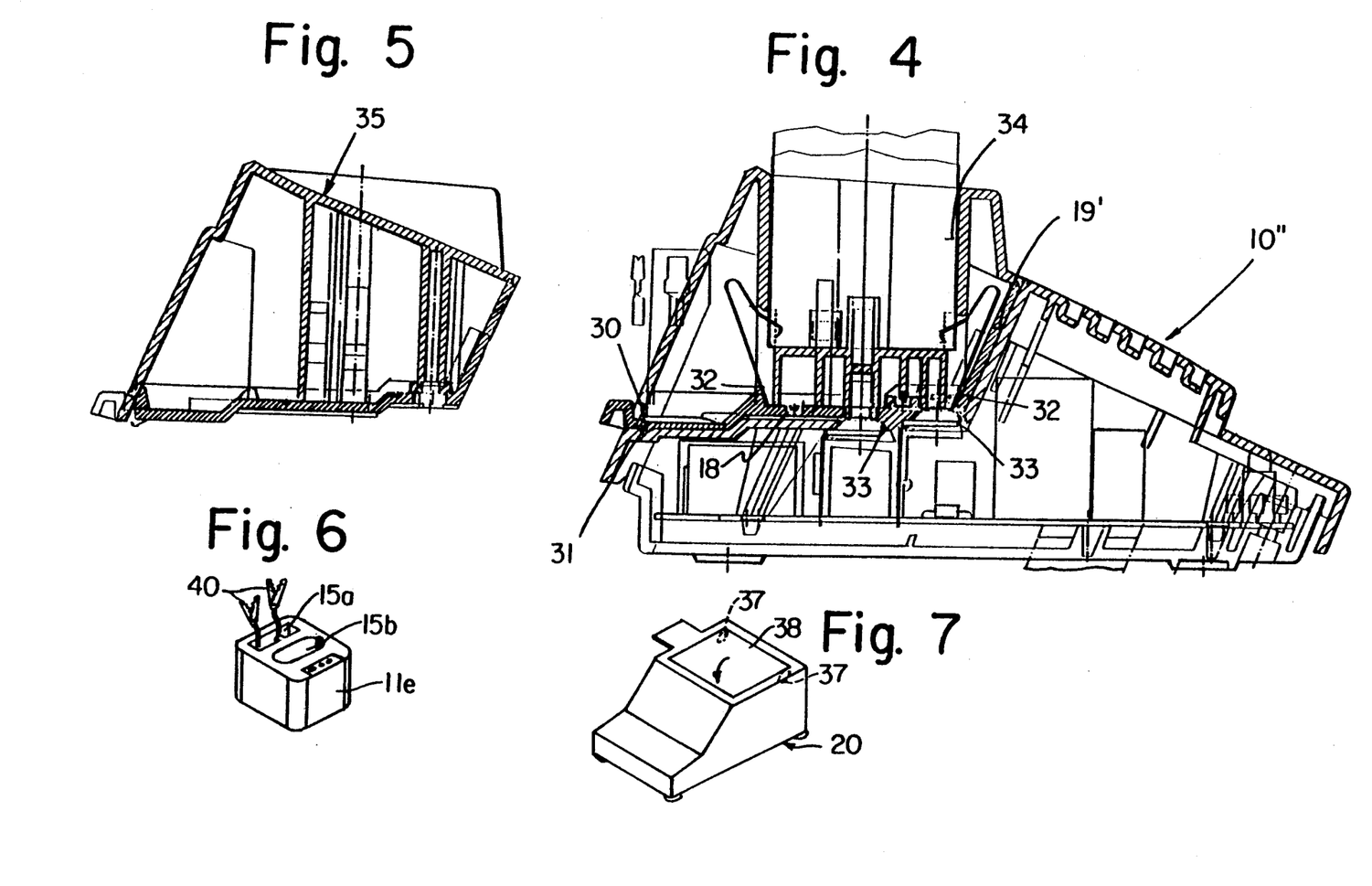
FIGS. 4 and 5 show cross-sections of an embodiment with an interchangeable adapter insert, which can be inserted horizontally from behind.
FIG. 6 shows a perspective view of still another embodiment of the interchangeable adapter insert with two differently shaped charge channels.
FIG. 7 is a perspective view of the additional adapter part of FIG. 3 in which the cover is shown.

For a further advantageous refinement of the invention, an interchangeable adapter insert is equipped with flexible, electric lines, which are taken to the outside and end in clamps 40 or other suitable contacting devices (FIG. 6). In this way, it becomes possible to charge also those storage batteries, such as vehicle batteries, which cannot be accommodated by the charging channels or otherwise do not fit.

It is obvious, that it is also possible, contrary to what has been described and shown previously, to introduce the exchangeable adapter inserts not from above, but from the side into the then appropriately constructed accommodating channel of the basic device. This is shown, by way of example, in FIGS. 4 and 5, in which the inserts are inserted from the rear. In such a case, the rear wall of the basic device is omitted, at least in the region of the accommodating channel. Such an arrangement has the advantage that, due to the longer wall defining the path, the contacts may be positioned so the contacts grind against one another, thus ensuring an appropriate cleaning of the contacts for establishing good contact.

FIGS. 4 and 5 show a charging device in greater detail. A storage battery channel 19' is shown on the basic device 10" for pushing-in or introducing batteries horizontally. A locking means 30, such as a locking slot 31 that forms a recess at the rear of the basic device, is positioned. The electrical contact connections 32 and 33, which have achieved mutual stationary contact, can furthermore be seen on the basic device 10" and on a suitable exterior surface region of the respective interchangeable adapter insert. The interchangeable adapter insert 35 can also have several charging channels 34, which make it possible to accommodate several rechargeable batteries at the same time.

If, for this latter case of a duo or tandem arrangement (such as two charging channels on one interchangeable adapter insert), the dimensions of the insert are too small, then this insert can also project, for example, laterally over the edges, that is, over the basic contour of the basic device so as to have a lateral bulge. The bulge forms a one-piece continuation with the one interchangeable adapter insert that is connected with the basic device, for example, by being pushed in from the rear. At the same time, the second charging channel, which is obtained by means of the one-piece attached form of the interchangeable adapter insert, can also itself be constructed as a general accommodating channel, for example, by removing a charging channel insert, so that the use of different charging channels for accommodating different battery dimensions is possible.

If more than one storage battery is to be charged at the same time, as is readily possible for smaller storage batteries, one interchangeable insert 11e may be equipped with two or more charging channels 15a, 15b as shown in FIG. 6. Preferably, storage batteries can then be used which have the same electrical data or characteristics. In this case, the electronic control circuit of the basic device need only increase the changing current to charge simultaneously.

Where storage batteries of different electrical data and/or manufacture are to be charged, the storage batteries can also be inserted at the same time but charged consecutively. For this purpose, a conventional control circuit 52 (shown in phantom lines in FIG. 1) is provided. The control circuit 52 has control electronics which switches to the inserted storage batteries consecutively in a conventional manner and will disconnect a storage battery which has already become charged, from receiving further supply of current. This can be accomplished via separate control information, which likewise can be supplied over the two-wire connecting line for the charging current or also over the temperature sensor line. In the storage battery accommodating region, there is still a switching part 18 (see FIG. 4), such as a relay, which is assigned to the storage battery connecting contacts 32, 33 and responds to the respective control information to either allow or cut off power for recharging. Otherwise, electrical connecting lines may be provided for the storage batteries that have been inserted and the electronics of the basic device then act upon the individual storage batteries consecutively by switching over. Since a common ground line can be used, the number of line connections remains small, even with such a refinement.

FIG. 7 shows an additional adapter part 20 which includes a cover 38 which is biased closed via springs 37 attached to the wall and cover of the adapter part 20. The cover 38 be forced inward into the accommodating channel when an adapter insert is inserted. In such a case, the cover pivots about the side where the springs are attached. The cover operates in the same manner on the basic device 10, 10' or 10''.

The invention may also include the accommodating channel of the basic device itself serving as a charging channel for an storage battery. If so, the charging channel may be made larger so that so that an additional adapter part can be dispensed with. The external shape of the additional adapter parts, which are then required for the different shapes of storage batteries, is designed so that it corresponds to the shape of the storage battery and can be inserted in the accommodating channel, which in this case, serves simultaneously as a charging channel.

While the foregoing description and drawings represent the preferred embodiments of the present invention, it will be understood that various changes and modifications may be made without deporting from the spirit and scope of the present invention.

What is claimed is:

1. A charging device for charging rechargeable storage batteries, comprising:
   a basic device which contains a recharging circuit for charging rechargeable storage batteries, the basic device containing an accommodating channel;
   an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged;
   means for electrically connecting the recharging circuit and the charging channel simultaneously upon completion of insertion of the interchangeable adapter insert into the accommodating channel; and
   additional of interchangeable adapter inserts each having a respective charging channel which differs from each other in the shape of said charging channel, each of the inserts being insertable one at a time into the accommodating channel.

2. The charging device of claim 1, wherein the basic device comprises a double-case construction which has a closed first housing part accommodating the recharging circuit, and has a second housing part having the accommodating channel.

3. The charging device as recited in claim 1, further comprising:
   a temperature sensor connection in the charging channel for sensing temperature of the battery.

4. A charging device for charging rechargeable storage batteries, comprising:
   a basic device which contains a recharging circuit for charging rechargeable storage batteries, the basic device containing an accommodating channel;
   an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates insertion of a battery that is to be charged; and
   means for electrically connecting the recharging circuit and the charging channel simultaneously upon completion of insertion of the interchangeable adapter insert into the accommodating channel, the electrically connecting means including channel and insert contacts which complete electrical connection therebetween when the interchangeable insert is inserted completely into the accommodating channel and which are disposed on the surfaces of the accommodating channel and on the surfaces of the interchangeable adapter insert respectively, the channel and insert contacts being positioned to grind against each other for cleaning the contacts to establish good contact therebetween as the insert is inserted into the accommodating channel.

5. The charging device of claim 1, wherein the accommodating channel of the basic device has means for accommodating insertion of a different battery therein and for charging the inserted different battery with the recharging circuit.

6. The charging channel of claim 4, wherein the contacts on the surfaces of the interchangeable adapter insert are formed as flexible, electrical lines, connected to the interchangeable adapter insert and are provided with contacting means at their ends.

7. A charging device for charging rechargeable storage batteries, comprising:
- a basic device which contains a recharging circuit for charging rechargeable storage batteries, the basic device containing an accommodating channel;
- an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged;
- means for electrically connecting the recharging circuit and the charging channel simultaneously upon completion of insertion of the interchangeable adapter insert into the accommodating channel; and
- a cover for closing any one of the accommodating and charging channels.

8. The charging device of claim 7, wherein the cover closes in response to removal of the insert which was inserted into the accommodating channel.

9. The charging device of claim 7, including mounting means connected to the cover for mounting said cover to swing inwardly against the force of a spring into the accommodating channel.

10. A charging device for charging rechargeable storage batteries, comprising:
- a basic device which contains a recharging circuit for charging rechargeable storage batteries, the basic device containing an accommodating channel;
- an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates insertion of a battery that is to be charged; and
- means for electrically connecting the recharging circuit and the charging channel simultaneously upon completion of insertion of the interchangeable adapter insert into the accommodating channel, the electrical connecting means including a lattice configuration for establishing electrical contact connections and electrical line connections between external contacts of the accommodating channel and respective battery connection contacts within the interchangeable adapter insert, the lattice configuration comprising electrical conducting tracks which have a plurality of different conducting paths within the interchangeable insert which are positioned to engage a plurality of different contact positions of respective batteries that are to be charged.

11. A charging device for charging rechargeable storage batteries, comprising:
- a basic device which contains a recharging circuit for charging rechargeable storage batteries, the basic device containing an accommodating channel;
- an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged; and
- means for electrically connecting the recharging circuit and the charging channel simultaneously upon completion of insertion of the interchangeable adapter insert into the accommodating channel, the electrical connecting means connecting the recharging circuit with individual, additional, interchangeable adapter inserts by, in each case, separate lines.

12. A charging device for charging rechargeable storage batteries, comprising:
- a basic device which contains a recharging circuit for charging rechargeable storage batteries, the basic device containing an accommodating channel;
- an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged;
- means for electrically connecting the recharging circuit and the charging channel simultaneously upon completion of insertion of the interchangeable adapter insert into the accommodating channel; and
- control means for directing the recharging circuit to charge at consecutive times, different batteries which are within respective charging channels simultaneously and for cutting off further supply of power to each of the different batteries as each becomes fully charged.

13. The charging device of claim 12, wherein the control means directs respective switches to open in the insert for cutting off the further supply of power.

14. The charging device of claim 13, wherein the control means cuts off the further supply of power directly.

15. A charging device for charging rechargeable storage batteries, comprising:
- a basic device which contains a recharging circuit for charging rechargeable storage batteries, the basic device containing an accommodating channel;
- an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged;

means for electrically connecting the recharging circuit and the charging channel simultaneously upon completion of insertion of the interchangeable adapter insert into the accommodating channel; and an additional adapter housing part, and attaching means for attaching said housing part to the basic device to form an additional accommodating channel for receiving another interchangeable adapter insert which has a charging channel.

16. A charging device for charging rechargeable storage batteries, comprising:

a basic device which contains a recharging circuit for charging rechargeable storage batteries, the basic device containing an accommodating channel;

an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged;

means for electrically connecting the recharging circuit and the charging channel simultaneously upon completion of insertion of the interchangeable adapter insert into the accommodating channel; and means for enabling lateral insertion of an interchangeable adapter insert into the basic device by an essentially horizontal pushing movement, said enabling means including an open side of the basic device.

17. A charging device for charging rechargeable storage batteries, comprising:

a basic device which contains a recharging circuit for charging rechargeable storage batteries, the basic device containing an accommodating channel;

an interchangeable adapter insert which is connected with the basic device by insertion into the accommodating channel, the insert and the accommodating channel having surfaces which face each other and extend in a direction of the insertion, the surfaces of the insert being complementary to the surfaces of the channel, the insert having a charging channel which accommodates the insertion of a battery that is to be charged; and means for electrically connecting the recharging circuit and the charging channel simultaneously upon completion of insertion of the interchangeable adapter insert into the accommodating channel, the interchangeable insert having an additional charging channel that extends beyond the edge of the basic device.

* * * * *